UNITED STATES PATENT OFFICE.

DANIEL MAURER, OF PHILADELPHIA, PENNSYLVANIA.

IMPROVEMENT IN INSECTICIDE COMPOUNDS.

Specification forming part of Letters Patent No. 205,405, dated June 25, 1878; application filed April 30, 1878.

*To all whom it may concern:*

Be it known that I, DANIEL MAURER, of the city and county of Philadelphia, and State of Pennsylvania, have invented a new and useful Improvement in Vermin-Destroying Compounds, which improvement is fully set forth in the following specification:

My invention consists of a composition of sirup, flour, and phosphorus, forming a compound for the destruction of rats, roaches, &c.

In preparing my compound, I take a quantity of sirup, say four gallons of the best quality, which I boil to 100° Reaumur, and then mix this sirup with the best flour until the mass assumes the consistency of a salve. I then reheat the same at 80° Reaumur and add to each gallon of sirup contained in this compound eight inches of ordinary phosphorus stick. This forms an effective poison for vermin, especially roaches. It is readily sought by them, and it will not in any case become sour, which, in other paste poisons, has, previous to my invention, been a radical disadvantage to their use.

The composition when eaten will poison the rats and roaches, and destroy the eggs of the latter when in contact with the preparation. At night flour will be sprinkled on the surface of the composition to conceal the luminous vapor of the phosphorus.

Rats, &c., are fond of sirup and flour, especially the latter, if sweetened. Sirup serves to keep the mass moist, and, with the flour, conceals the flavor of the phosphorus. Phosphorus readily unites with sirup and flour, and forms a smooth composition, which is appreciated and readily devoured by the vermin.

By cooking the sirup and afterward reheating the sirup and flour, the paste is effectively prevented from souring. Sirup contains watery substances, and without the first boiling would not keep sweet in the paste. After it has been boiled and combined with the flour, I find that the degree of heat—viz., 80° Reaumur—just cooks the flour sufficiently to prevent it from liability of spoiling, and also to admit of its ready combination with the phosphorus.

I am aware that phosphorus has been combined with a paste of flour and other substances; but I am not aware that boiled sirup combined with flour, then reheated and combined with phosphorus, has been made previous to my discovery.

What I claim is—

As an improvement in the manufacture of phosphorus-paste, first boiling sirup, to this adding flour, then reheating the same, and afterward combining phosphorus therewith, all substantially in the proportions and manner herein specified.

DANIEL MAURER.

Witnesses:
CONRAD MAURER,
JOHN A. WIEDERSHEIM.